United States Patent [19]
Ozcelik et al.

[11] Patent Number: 5,764,307
[45] Date of Patent: Jun. 9, 1998

[54] METHOD AND APPARATUS FOR SPATIALLY ADAPTIVE FILTERING FOR VIDEO ENCODING

[75] Inventors: Taner Ozcelik, San Jose, Calif.; James C. Brailean, Park Ridge; Aggelos K. Katsaggelos, Chicago, both of Ill.; Ozan Erdogan, Davis, Calif.; Cheung Auyeung, Hoffman Estates, Ill.

[73] Assignees: Motorola, Inc., Schaumburg; Northwestern University, Evanston, both of Ill.

[21] Appl. No.: 506,272

[22] Filed: Jul. 24, 1995

[51] Int. Cl.$^6$ ..................................................... H04N 5/21
[52] U.S. Cl. .......................... 348/608; 348/607; 382/261
[58] Field of Search .................................. 348/607, 608, 348/609, 701, 700, 620, 621, 618, 619, 384, 390; 382/254, 260, 261, 262, 263, 264; 358/463; H04N 5/21

[56] References Cited

U.S. PATENT DOCUMENTS

| | | | |
|---|---|---|---|
| 5,193,001 | 3/1993 | Kerdranvrat | 358/105 |
| 5,351,314 | 9/1994 | Vaezi | 382/54 |
| 5,424,783 | 6/1995 | Wong | 348/607 |
| 5,491,519 | 2/1996 | Kim | 348/608 |
| 5,502,489 | 3/1996 | Kim et al. | 348/607 |

OTHER PUBLICATIONS

"Image Sequence Compression Using a Pel-Recursive Motion-Compensated Technique" Robert J. Moorhead II, Sarah a. Rajala, and Lawrence W. Cook, IEEE Journal on Selected Areas in Communications, vol. SAC-5, No. 7, Aug., 1987, pp. 1100–1114.

"The Efficiency of Motion-Compensating Prediction for Hybid Coding of Video Sequences" Bernd Girod, IEEE Journal on Selected Areas in Communications, vol. SAC-5, No. 7, Aug., 1987 pp. 1140–1154.

(List continued on next page.)

*Primary Examiner*—Christopher C. Grant
*Attorney, Agent, or Firm*—Darleen J. Stockley

[57] ABSTRACT

The present invention provides a method (200) and an apparatus (100) for spatially adaptive filtering for video encoding. The apparatus filters a video sequence prior the encoding process. The apparatus comprises a noise variance determiner (102), a local variance determiner (104), a noise visibility function determiner (106), a Gaussian kernel determiner (108), and a convolver (110). The apparatus removes noise directly from a Displaced Frame Difference, DFD, signal. This novel approach removes noise and miscellaneous high frequency components from the DFD signal without the introduction of the filtering artifacts characteristic of current techniques. By reducing the miscellaneous high frequency components, the present invention is capable of reducing the amount of information that must be encoded by the video encoder without substantially degrading the decoded video sequence.

24 Claims, 1 Drawing Sheet

OTHER PUBLICATIONS

"Improvements of Transform Coding Algorithm for Motion-Compensated Interframe Prediction Errors—DCT/SQ Coding" Masahide Kaneko, Yosinori Hatori and Atsushi Koike, IEEE Journal on Selected Areas in Communications, vol. SAC-5, No. 7 Aug., 1987.

"Gradient-Based Algorithms for Block-Oriented MAP Estimation of Motion and Application to Motion-Compensated Temporatl Interpolation" Claude Bergeron and Eric Dubois, IEEE Transactions on Circuits and Systems for Video Technology, vol. 1, No. 1, Mar. '91 pp. 72–85.

"Use of Colour Information in Bayesian Estimation of 2-D Motion" Janusz Konrad and Eric Dubois, INRS-Telecommunications, M17.23, pp. 2205–2208.

"Motion-Compensated Filtering of Time-Varying Images" Eric Dubois, INRS-Telecommunications, May, 1991, pp. 103–131.

"Comparison of Stochastic and Deterministic Solution Methods in Bayesian Estimation of 2D Motion", Janusz Konrad and Eric Dubois, INRS-Telecommunications, vol. 9, No. 4, Aug., 1991, pp. 215–228.

"Low Bit Rate Video Coding Robust Motion Vector Regeneration in the Decoder" Mark R. Banham, James C. Brailean, Cheuk L. Chan, Aggelos K. Katsaggelos, IEEE Transactions on Image Processing, vol. 3, No. 5, Sep., 1994, pp. 652–665.

"An Asaptive Regularized Recursive Displacement Estimation Algorithm", Serafim N. Efstratiadis, Aggelos K. Katsaggelos, IEEE Transactions on Image Processing, vol. 2, No. 3, Jul. 1993, pp. 341–352.

"Image Segmentation Based on Object Oriented Mapping Parameter Extimation" Michael Hotter and Robert Thoma, Signal Processing 15 (1988) pp. 315–344.

"Object-Oriented Motion Estimation and Segmentation in Image Sequences" Norbert Diehl, Signal Processing:Image Communications 3 (1990) pp. 23–56.

"Object-Oriented Analysis-Synthesis coding of Moving Images" Hans Georg Musmann, Michael Hotter and Jorn Ostermann, Signal Processing, Image Communications (1980) 117–135.

METHOD AND APPARATUS FOR SPATIALLY ADAPTIVE FILTERING FOR VIDEO ENCODING

FIELD OF THE INVENTION

The present invention relates generally to video coding, and more particularly to utilizing a spatially adaptive pre-processing filter for use in video coding.

BACKGROUND OF THE INVENTION

Current standards, such as H.261, MPEG1, and MPEG2 provide compression of a digital video sequence by utilizing a block motion-compensated Discrete Cosine Transform, DCT, approach. This video encoding technique removes the redundancy present in a video sequence by utilizing a two-step process. In the first step, a block-matching, BM, motion estimation and compensation algorithm estimates the motion that occurs between two temporally adjacent frames. The frames are then compensated for the estimated motion and compared to form a difference image. By taking the difference between the two temporally adjacent frames, all existing temporally redundancy is removed. The information that remains is new information that was not compensated for in the motion estimation and compensation algorithm. This difference image is referred to as the displaced frame difference, DFD.

In the second step, the DFD image is transformed into a frequency domain using the DCT. The DCT has the property of compacting the energy of the DFD image into a few low frequency components. Further compression of the video sequence is obtained by limiting the amount of high frequency information encoded.

If noise is present in a video sequence, then the DFD image will also contain the difference of this noise. Since the noise is uncorrelated in the temporal direction, the energy of the noise present in the DFD image is actually double the noise energy present in any single frame. After applying the DCT, the noise present in the DFD results in an increase in the energy present in the high frequency components. The net effect is the compression technique is forced to use a large number of bits, as compared to the case when the noise is not present, to maintain a particular distortion in the decoded video. In other words, noise present in a video sequence prior to encoding, results in a large decrease in the compression efficiency of any compression technique.

Current approaches for removing noise from a video sequence are inadequate for two reasons. The first reason is that these approaches attempt to remove the noise from the intensity frames of the video sequence. Generally, this type of approach introduces artifacts into the video sequence that are then transferred to the DFD signal and interpreted by the video encoder as new information that must be encoded. In other words, these approaches can also reduce the compression efficiency of the video encoder. The second reason that current approaches are inadequate is that they tend to operate only in the temporal direction. That is, they filter along a single direction between frames. If averaging is used, then the parts of the video sequence that are in motion will be blurred. By blurring the moving objects the video sequence in general will be easier to encode. However, it will look substantially degraded to the viewer. Therefore, the current approaches to removing noise are unable to reduce the amount of information that must be encoded by the video encoder without substantially degrading the decoded video sequence.

DETAILED DESCRIPTION OF PREFERRED EMBODIMENTS

The method and apparatus described below filter a video sequence prior the encoding process of a video sequence. Specifically, a method and apparatus are described wherein a spatially adaptive filter is used to remove noise directly from the Displaced Frame Difference, DFD, signal. This novel approach removes noise and miscellaneous high frequency components from the DFD signal without the introduction of the filtering artifacts characteristic of current techniques. By reducing the miscellaneous high frequency components the present invention is capable of reducing the amount of information that must be encoded by the video encoder without substantially degrading the decoded video sequence.

In order to describe the method and apparatus certain assumptions are made concerning the input video sequence. Specifically, the video source is assumed to be in a digital format where the number of pixels per row, the number of rows per frame, and the number of frames per second are known prior to processing. Each pixel represents both the luminance and chrominance components using 8 bit integer numbers which span from 0 to 255. As mentioned above, these assumptions are only made to help facilitate the description of the method and apparatus and should not be viewed as restrictions to applications where these assumptions do not hold.

Figure 1:
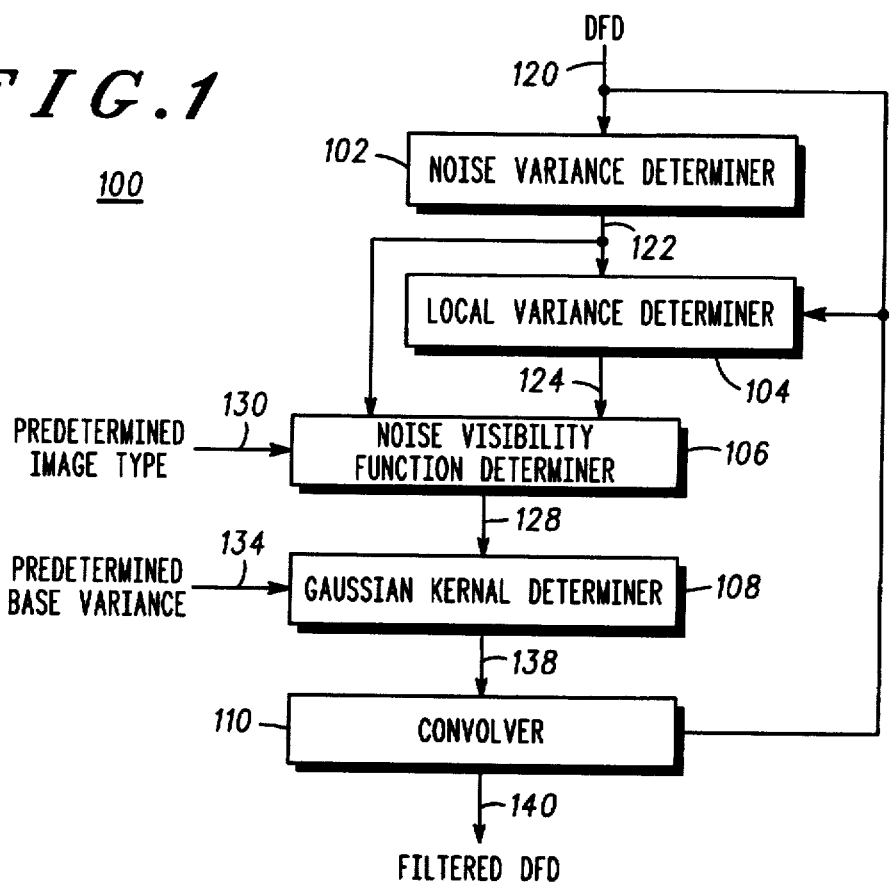
FIG. 1. is a block diagram of a preferred embodiment of an apparatus for spatially adaptive filtering for video encoding in accordance with the present invention.

FIG. 1, numeral 100 is a block diagram of a preferred embodiment of an apparatus for spatially adaptive filtering for video encoding in accordance with the present invention. The apparatus comprises a noise variance determiner (102), local variance determiner (104), noise visibility function determiner (106), Gaussian kernel determiner (108), and a convolver (110). Utilizing a DFD (120) signal, the noise variance determiner (102) calculates an estimate of the noise variance $\sigma_n^2(r)$ (126). Also utilizing the DFD (120) signal the local variance determiner determines an estimate of the local signal variance $\sigma_f^2(r)$ (128). Based on the local signal variance $\sigma_f^2(r)$ (128) and noise variance $\sigma_n^2(r)$ (126) estimates and a predetermined image type parameter $\Theta(130)$, the noise visibility function determiner determines a noise visibility parameter $\upsilon(\Theta)$ (132) which controls the amount of filtering provide by the spatially adaptive preprocessing filter at pixel location (r) $\equiv(i,j)$. Specifically, the noise visibility parameter $\upsilon(\Theta)$ (132) is used by the Gaussian kernel determiner (110) to determine a Gaussian filtering kernel that will provide the proper amount of local filtering based on the local SNR.

The apparatus may be embodied in computer software, a Digital Signal Processor, a gate array, an application specific integrated circuit, a computer diskette having a stored program to impart processing functionality for implementing the steps of the method by the computer, or a memory unit of a computer that includes a program to impart processing functionality for implementing the steps of the method by the computer.

Utilizing the DFD signal, the noise variance determiner (102) determines an estimate of the noise variance $\sigma_n^2$ (126). This is accomplished by first dividing the DFD signal into 16×16 blocks and calculating the energy contained in these blocks. It should be noted that if block matching, BM, is used in generating the DFD signal, then these energy calculations already exist. The energy is calculated using the following expression $$\sigma_B^2(B_m) = \frac{1}{MN} \sum_{\{i,j \in B_m\}} (DFD(i,j))^2, \quad (1)$$

where pixel location i,j is a member of block $B_m$. M and N are the number of pixels contained in a row and column of block $B_m$, and $\sigma_b^2(B_m)$ is the energy contained in block $B_m$. Once the energy, $\sigma_B^2(B_m)$, is calculated for each block they are rank ordered from highest to lowest energy. The average of the bottom 25% values in this ranking is used as the estimate of the noise variance, $\sigma_n^2$ (126).

The local signal variance is calculated utilizing the noise variance estimate $\sigma_n^2$ (126) and a local variance $\sigma_l^2(r)$. It is known that the local DFD variance $\sigma_l^2(r)$ is the total of the local signal variance $\sigma_f^2(r)$ (128) plus the noise variance $\sigma_n^2$ (126).

Therefore, an estimate of the local signal variance is obtained by subtracting the noise variance estimate from the local DFD signal variance. This is demonstrated below $$\sigma_f^2(r) = \sigma_d^2(r) - \sigma_n^2(r), \quad (2)$$

where $$\sigma_d^2(r) = \frac{1}{MN} \sum_{\substack{-K \le k \le K \\ L \le l \le L}} (DFD(i+k, j+l))^2, \quad (3)$$

K and L define the local neighborhood that the local signal variance is calculated over. Specifically, the local signal variance $\sigma_f^2(r)$ (128) is calculated within a block that extends K rows above and below pixel (r)=(i,j), as well as L columns to the left and right.

The visibility parameter $\upsilon(\Theta)$ (132) which controls the amount of filtering provide by the spatially adaptive preprocessing filter at pixel location (r)=(i,j), is calculated by the noise visibility function determiner. Based on the local signal variance $\sigma_f^2(r)$ (128) and noise variance $\sigma_n^2(r)$ (126) estimates and a predetermined image type parameter $\Theta$(130), the noise visibility function determiner determines the noise visibility parameter using the following equation $$\upsilon(\Theta) = \frac{1}{1 + \frac{\sigma_f^2}{\sigma_n^2} \Theta}. \quad (4)$$

To reduce noise present in a DFD signal the predetermined image type parameter $\Theta$(130) is typically set at a value of 0.01. For different types of image data the image type parameter $\Theta$ is adjusted to provide the visibility with a different response. For example, due to their sensitivity to over-smoothing as opposed to the presence of noise, intensity images would require the image type parameter $\Theta$ to increased when compared to the value used for a DFD signal.

Based on the noise visibility parameter $\upsilon(\Theta)$ (132) the Gaussian kernal determiner (108) determines a Gaussian filtering kernel that will provide the proper amount of local filtering based on the local SNR. The response of the Gaussian kernel determiner (108) TO THE NOISE VISIBILITY PARAMETER $\upsilon(\Theta)$ (132) is shown below $$g(m, n) = \frac{1}{Z} e^{[-\frac{m^2+n^2}{\upsilon(\Theta)\sigma_g^2}]}, \quad (5)$$

where (m,n) is the Gaussian filtering, (m,n) is a location in the filters support, and $\sigma_g^2$ is the variance of the filter. The support of the filter is determined prior to implementation.

Typically, to reduce the number of operations required to be performed in the convolver (110), the support of the filter is 5 pixel rows by 5 pixel columns. The variance of the filter is also predetermined and along with the noise visibility parameter $\upsilon(\Theta)$ (132) is used to control the amount of smoothing applied to the DFD by the filter.

The noise visibility parameter $\upsilon(\Theta)$ (132) controls the amount of smoothing applied to the DFD by the filter, in the following way. If the noise variance $\sigma_n^2(r)$ (126) is small compared to the local signal variance $\sigma_f^2(r)$ (128), than the noise visibility parameter $\upsilon(\Theta)$ (132) is also be small. This results in a Gaussian filter g(m,n) with a narrow spatial response or a wide pass-band in the frequency domain. In other words, the filter g(m,n) would provide very little smoothing. This is the desired response, since the noise variance is small compared to the signal variance. For the case when the local signal variance is much smaller than the noise variance, g(m,n) will have a wide spatial response which would result in a narrow passband in the frequency domain. Again, this is the desired response, since the g(m,n) would provide smoothing to a very noisy DFD.

The convolver (110) actually carries out the filtering operation on the DFD signal. That is, the convolver (110) applies the Gaussian filter g(m,n) (138) to the DFD signal (120) through a convolution operation. The convolution operation is characterized by the following equation.

$$\hat{DFD}(i,j) = \sum_{m=0}^{m=5} \sum_{n=0}^{n=5} g(m, n) DFD(i-m, j-n), \quad (6)$$

where $\hat{DFD}$ (140) is the preprocessed DFD signal.

Figure 2:
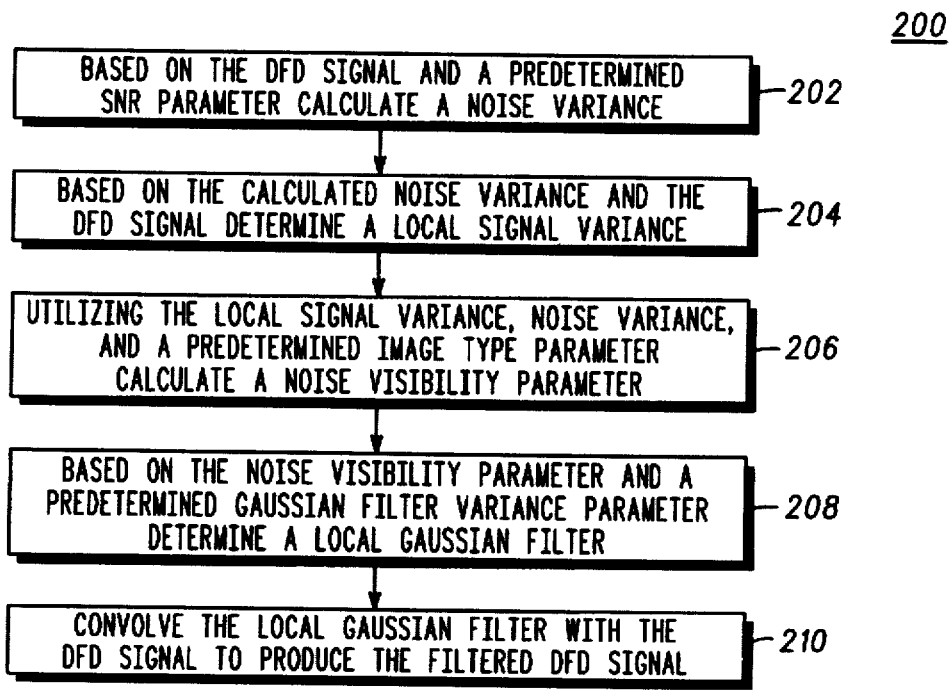
FIG. 2. is a flow diagram of a preferred embodiment of steps of a method for spatially adaptive filtering for video encoding in accordance with the present invention.

FIG. 2, numeral 200 is a flow diagram of a preferred embodiment of a method for spatially adaptive filtering for use in video encoding. The first step is calculating the noise variance based on the DFD signal (202). Next, a local signal variance is determined based on the calculated noise variance and the DFD signal (204). Utilizing the local signal variance, noise variance, and a predetermined image type parameter, a noise visibility parameter is then calculated (206). A local Gaussian filter is determined based on the noise visibility parameter and a predetermined Gaussian filter variance parameter (208). Then, the local Gaussian filter is convolved with the DFD signal to produce the filtered DFD signal (210).

We claim:

1. A method of spatially adaptive filtering a displaced frame difference, a DFD, the DFD is a difference between a video frame and an estimated video frame, the method comprising:

determining, using a noise variance determiner, a noise variance of the DFD based on a predetermined signal-to-noise ratio;

determining, using a local variance determiner, a local variance of the DFD based on the noise variance and the predetermined signal-to-noise ratio;

determining, using a noise visibility determiner, a noise visibility function based on the noise variance, the local variance, and a predetermined image type;

determining, using a Gaussian kernel determiner, a Gaussian kernel for every pixel in the DFD based on the noise visibility function, a predetermined normalizing coefficient, and a predetermined base variance; and convolving, using a convolver, the DFD with the Gaussian kernel to provide an adaptively filtered DFD.

2. The method of claim 1 wherein the noise variance is determined by calculating an energy contained in each predefined block using the following equation:

$$\sigma_B^2(B_m) = \frac{1}{MN} \sum_{\{i,j \in B_m\}} (DFD(i,j))^2,$$

where M and N are the dimensions of the predefined block and i,j denotes a row and column of a pixel in the predefined block.

3. The method of claim 1 wherein the local variance of the DFD is determined using the following equation:

$$\sigma_f^2(r) = \frac{1}{MN} \sum_{\substack{-K \leq k \leq K \\ L \leq l \leq L}} (DFD(i+k, j+l))^2$$

where M and N are the dimensions of the predefined block and i,j denotes a row and column of a pixel in the predefined block.

4. The method of claim 1 wherein the noise visibility function is determined using the following equation:

$$\upsilon(\Theta) = \frac{1}{1 + \frac{\sigma_f^2}{\sigma_n^2} \Theta}$$

where $\sigma_f^2$ is the local variance, $\sigma_n^2$ is the noise variance, and $\Theta$ is the predetermined image type.

5. The method of claim 1 wherein the Gaussian kernel is determined using the following equation:

$$g(m, n) = \frac{1}{Z} e^{[-\frac{m^2+n^2}{\upsilon(\Theta)\sigma_g^2}]}$$

where $\sigma_g^2$ is the predetermined base variance, Z is the predetermined normalizing coefficient, $\upsilon(\Theta)$ is the noise visibility function, and m,n denotes a row and column of a pixel in the DFD.

6. The method of claim 1 wherein the DFD convolved with the Gaussian kernel is determined using the following equation:

$$\hat{DFD}(i,j) = \sum_{\substack{m=0 \\ n=0}}^{\substack{m=5 \\ n=5}} g(m, n) DFD(i-m, j-n),$$

where g(m,n) is the Gaussian kernel and m,n denotes a row and column of a pixel in the DFD.

7. The method of claim 1 wherein the steps of the method are embodied in a Digital Signal Processor, DSP, that has been programmed with said steps.

8. The method of claim 1 wherein the steps of the method are embodied in an Application Specific Integrated Circuit, ASIC, arranged to provide said steps.

9. The method of claim 1 wherein the steps of the method are embodied in a gate array that has been arranged to provide said steps.

10. The method of claim 1 wherein the steps of the method are stored in a computer memory.

11. The method of claim 10 wherein the computer memory is a computer diskette having a stored program to impart processing functionality for implementing the steps of the method by the computer.

12. The method of claim 10 wherein the computer memory is a memory unit of the computer that includes a program to impart processing functionality for implementing the steps of the method by the computer.

13. An apparatus for spatially adaptive filtering a displaced frame difference, a DFD, the DFD is a difference between a video frame and an estimated video frame, the apparatus comprising:

a noise variance determiner, operably coupled to receive the DFD and a predetermined signal-to-noise ratio, for determining a noise variance of the DFD based on the predetermined signal-to-noise ratio;

a local variance determiner, operably coupled to the noise variance determiner and operably coupled to receive the DFD, for determining a local variance of the DFD based on the noise variance and the predetermined signal-to-noise ratio;

a noise visibility determiner, operably coupled to the noise variance determiner and the local variance determiner and operably coupled to receive a predetermined image type, for determining a noise visibility function based on the noise variance, the local variance, and the predetermined image type;

a Gaussian kernel determiner, operably coupled to the noise visibility determiner and operably coupled to receive a predetermined base variance, for determining a Gaussian kernel for every pixel in the DFD based on the noise visibility function, a predetermined normalizing coefficient, and the predetermined base variance; and a convolver, operably coupled to the Gaussian kernel determiner and operably coupled to receive the DFD, for convolving the DFD with the Gaussian kernel to provide an adaptively filtered DFD.

14. The apparatus of claim 13 wherein the noise variance is determined by calculating an energy contained in each predefined block using the following equation:

$$\sigma_B^2(B_m) = \frac{1}{MN} \sum_{\{i,j \in B_m\}} (DFD(i,j))^2,$$

where M and N are the dimensions of the predefined block and i,j denotes a row and column of a pixel in the predefined block.

15. The apparatus of claim 13 wherein the local variance of the DFD is determined using the following equation:

$$\sigma_f^2(r) = \frac{1}{MN} \sum_{\substack{-K \leq k \leq K \\ L \leq l \leq L}} (DFD(i+k, j+l))^2$$

where M and N are the dimensions pf the predefined block and i,j denotes a row and column of a pixel in the predefined block.

16. The apparatus of claim 13 wherein noise visibility function is determined using the following equation:

$$\upsilon(\Theta) = \frac{1}{1 + \frac{\sigma_f^2}{\sigma_n^2} \Theta}$$

where $\sigma_f^2$ is the local variance, $\sigma_n^2$ is the noise variance, and $\Theta$ is the predetermined image type.

17. The apparatus of claim 13 wherein the Gaussian kernel is determined using the following equation:

$$g(m,n) = \frac{1}{Z} e^{[-\frac{m^2+n^2}{\upsilon(\Theta)\sigma_g^2}]}$$

where $\sigma_g^2$ is the predetermined base variance, Z is the predetermined normalizing coefficient, $\upsilon(\Theta)$ is the noise visibility function, and m,n denotes a row and column of a pixel in the DFD.

18. The apparatus of claim 13 wherein the DFD signal convolved with the Gaussian kernel is determined using the following equation:

$$\hat{DFD}(i,j) = \sum_{\substack{m=0 \\ n=0}}^{\substack{m=5 \\ n=5}} g(m,n) DFD(i-m, j-n),$$

where g(m,n) is the Gaussian kernel and m,n denotes a row and column of a pixel in the DFD.

19. The apparatus of claim 13 wherein the apparatus includes a Digital Signal Processor, DSP.

20. The apparatus of claim 13 wherein the apparatus includes an Application Specific Integrated Circuit, ASIC.

21. The apparatus of claim 13 wherein the apparatus includes a gate array.

22. The apparatus of claim 13 wherein the apparatus includes a computer usable medium having computer readable program codes.

23. The apparatus of claim 22 wherein the computer usable medium is a computer diskette.

24. The apparatus of claim 22 wherein the computer usable medium is a memory unit of the computer.

* * * * *